United States Patent [19]

Enda

[11] Patent Number: 4,527,108
[45] Date of Patent: Jul. 2, 1985

[54] LINEAR ACTUATOR WITH MAGNETS
[75] Inventor: Toyoaki Enda, Tokyo, Japan
[73] Assignee: Iwatsu Electric Co., Ltd., Tokyo, Japan
[21] Appl. No.: 482,702
[22] Filed: Apr. 6, 1983
[30] Foreign Application Priority Data
  Apr. 19, 1982 [JP] Japan .................................. 57-65636
[51] Int. Cl.³ ............................................ G05B 11/00
[52] U.S. Cl. ..................... 318/687; 318/662; 318/671
[58] Field of Search ...................... 318/687, 662, 671; 369/291, 147; 346/139 R

[56] References Cited
U.S. PATENT DOCUMENTS 4,281,225  7/1981  Ito et al. ............................... 369/139
4,456,934  6/1984  Wedman et al. ....................... 360/78

OTHER PUBLICATIONS

"Y-Axis Pen Handling System", Robert D. Haselby et al., Hewlett-Packard Journal, Nov. 1981, pp. 25-32.

Primary Examiner—William M. Shoop
Assistant Examiner—Saul M. Bergmann
Attorney, Agent, or Firm—Woodcock, Washburn, Kurtz, Mackiewicz & Norris

[57] ABSTRACT

Device for moving a member linearly is composed of at least two permanent magnets, a driving coil, circuit for supplying the driving coil with current, a moving member, and a detector. The two permanent magnets form magnetic field of first direction in first space and field of second direction being reverse to the first direction in second space. Since the driving coil includes a portion disposed in the first space and a portion disposed in the second space, a movement of a given direction is created based on the current flowing through the driving coil. The first and second spaces include a region where the strength of the magnetic field varies gradually. Therefore the relative movement of the driving coil and the permanent magnets can be detected using the detector. The moving member is connected to either the driving coil or the permanent magnet a pen or the like can thus be moved linearly if attached to the member.

9 Claims, 12 Drawing Figures

LINEAR ACTUATOR WITH MAGNETS

BACKGROUND OF THE INVENTION

The present invention relates to device for moving a member linearly, which is adaptive for vertical driving of a pen of an X-Y plotter, drafter or the like, i.e. a linear actuator.

A system for a driving a pen using a plunger solenoid is known as means for controlling a pen of an X-Y plotter. In this system, it is difficult not only to reduce the impact at contact of the pen with a recording paper but also to adjust the pressure of the pen against the recording paper.

In order to eliminate disadvantages as above described, in "HEWLETT-PACKARD JOURNAL" published on November 1981, "Y-Axis Pen Handling System", a system using a magnet and a voice-coil was disclosed by Robert D. Haselby et al. This system includes a position sensor for a pen, and enables the control of the coil current corresponding to the position of the pen and therefore performs pen-lift control smoothly and rapidly. However, this reference discloses only a system for detecting the position of the pen optically using a light-emitting-diode (LED), a phototransistor and a position sensor flag, but not system for detecting the pen position and speed by magnetic means.

SUMMARY OF THE INVENTION

An object of this invention is to provide a linear actuator in which a pen or the like can be controlled easily.

Another object of this invention is to provide a linear actuator in which the position detection can be performed easily and accurately.

Still another object if this invention is to provide a linear actuator in which speed detection can be performed easily and accurately.

A further object of this invention is to provide a linear actuator in which the response speed of contacting a pen with a recording paper can be increased, and impact of the pen at contact can be reduced and the contact pressure adjusted.

A device for linearly moving a pen or the like according to this invention has at least first and second magnet plates. The first permanent magnet plate is so disposed that it generates a magnetic field, i.e. magnetic line of force of a first direction in a first space. The second permanent magnet plate is so disposed that it also generates a magnetic field, i.e. magnetic line of force of a second direction which is opposite to the first direction in a second space adjacent to the first space. The first and second permanent magnet plates are so arranged that the magnetic field strength substantially becomes zero at the boundary between the first space and the second space on account of interaction of both magnet plates, and that the field strength varies gradually in the region near the boundary.

The device according to this invention is provided with a driving coil extending in the first and second spaces. The driving coil comprises a first portion disposed substantially within the first space which is subjected to the magnetic field in the first direction and a second portion disposed substantially within the second space which is subjected to the magnetic field in the second direction. When the driving coil is supplied with current from a current source, relative movement is created between the driving coil and the first and second permanent magnet plates. If the permanent magent plates are stationary, the driving coil is moved; if the driving coil is stationary, the permanent magnet plates are moved. The device of this invention is also provided with a member moving linearly based upon the above-mentioned relative movement.

The device of this invention is further provided with a means for detecting the relative movement between the driving coil and the permanent magnet plates using the magnetic field in the first and second spaces. The detecting means is arranged fixedly with respect to the driving coil. Thus the relative movement between the driving coil and the permanent magnet plates can be detected magnetically using this detecting means.

A preferred embodiment of this invention has detecting means comprising a Hall element for position detecting and a coil for speed detecting. The Hall element is arranged within the driving coil, and the speed detecting coil is wound in concentric relation to the driving coil.

In the preferred embodiment of this invention, the magnetic field in the first space is formed by a pair of first and third permanent magnet plates, and the field in the second space is by a pair of second and fourth permanent magnet plates.

The above and other objects, features and advantages of this invention and the manner of attaining them will become more apparent, and the invention itself will best be understood, from a study of the following description of a preferred embodiment illustrated in the attached drawings.

DESCRIPTION OF THE PREFERRED EMBODIMENT

Figure 1:
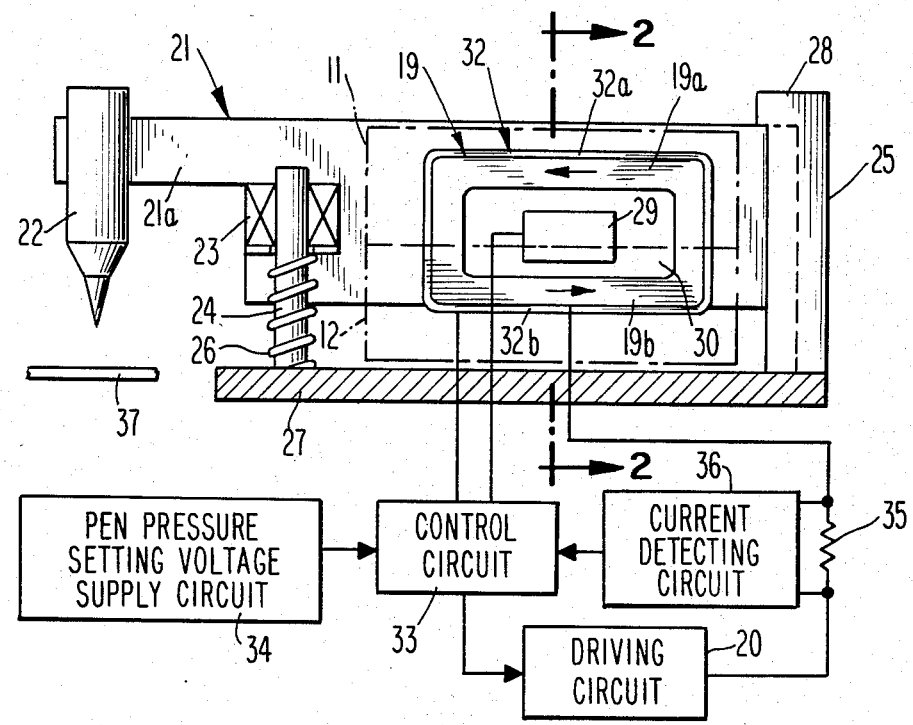
FIG. 1 is a front view partly in section of device for driving a pen linearly according to this invention.
Figure 2:
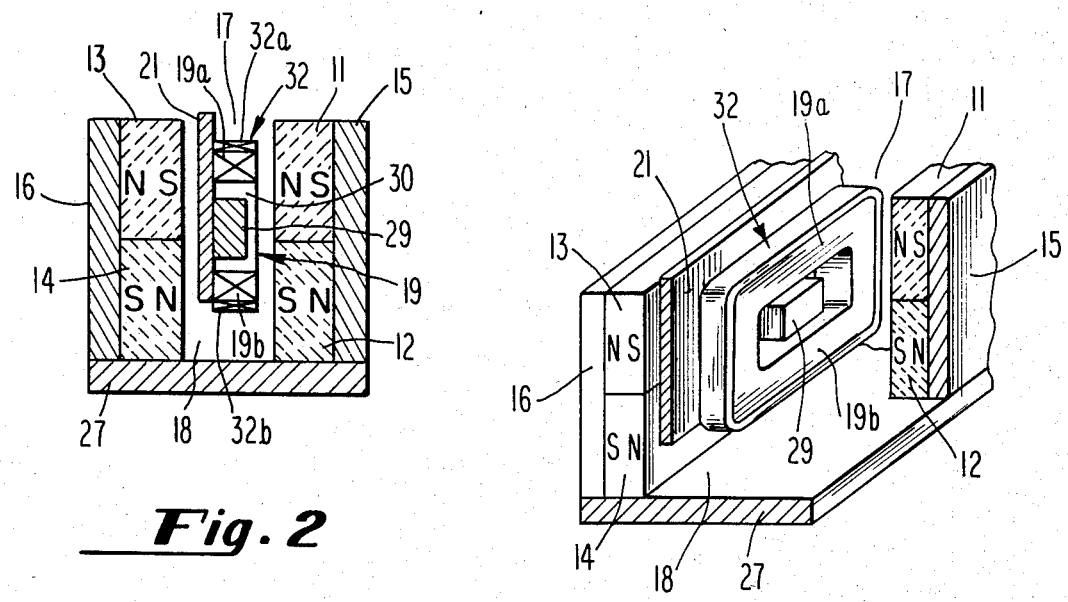
FIG. 2 is a sectional view illustrating a portion of device corresponding to line 2—2 in FIG. 1.
Figure 3:
FIG. 3 is a perspective view partly cut-away illustrating permanent magnets, a driving coil, a Hall element and a speed detecting coil of the device in FIG. 1.

A device for moving linearly a pen for an X-Y plotter in a first embodiment of this invention is shown in FIGS. 1 through 3. The devices comprises first, second, third and fourth permanent magnet plates 11, 12, 13 and 14 so as to form magnetic circuit. The four magnets 11, 12, 13 and 14 are rare-earth cobalt magnets of flat rectangular shape. The first and third permanent magnets 11 and 13 are magnetized nearly uniformly so that one main surface, i.e. the left-hand surface becomes the N-pole and other main surface, i.e. the right-hand surface becomes the S-pole. The second and fourth permanent magnets 12 and 14 are also magnetized nearly uniformly so that one main surface, i.e. left-hand surface becomes the S-pole and the other main surface, i.e. the right-hand surface becomes the N-pole.

As clearly seen from FIGS. 2-5, the first permanent magnet 11 is fixed to one support member 15 so that it extends in the vertical direction, i.e. Y-axis direction. The second permanent magnet 12 is disposed under the first permanent magnet 11 and is adjacent thereto and also fixed to the support member 15. The third permanent magnet 13 is fixed to other support member 16 and is opposed to the first permanent magnet 11. The fourth permanent magnet 14 is fixed to the support member 16 under the third permanent magnet 13 and is opposed to the second permanent magnet 12.

As a result, a first space 17 is formed between the first permanent magnet 11 and the third permanent magnet 13; a second space 18 is formed between the second permanent magnet 12 and the fourth permanent magnet 14.

Figure 4:
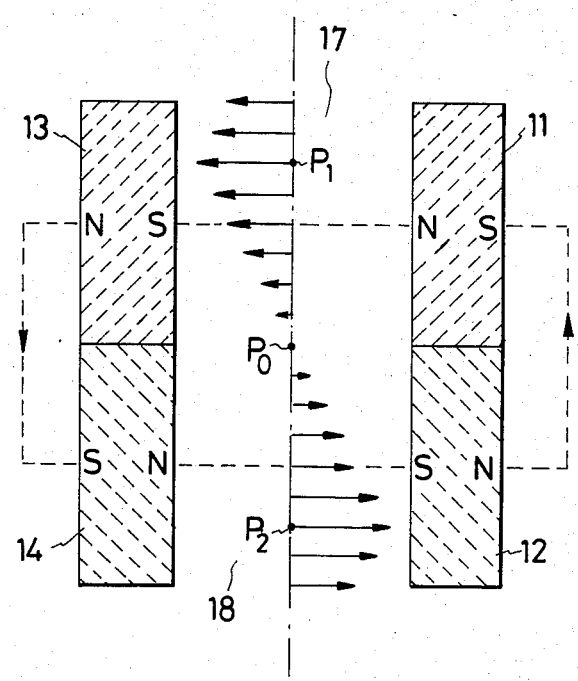
FIG. 4 is a sectional view illustrating the direction and strength of the magnetic field resulting from the first through fourth permanent magnets of the device in FIG. 1.
Figure 5:
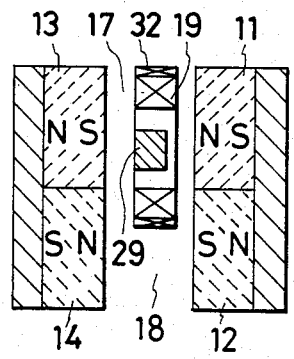
FIG. 5 is a sectional view illustrating upward movement of the driving coil of the device in FIG. 1.

Since both support members 15 and 16 shown in FIGS. 2 and 3 are magnetic plates which are not subjected to magnetic saturation, the four permanent magnets 11-14 form the closed magnetic circuit as shown by dotted line in FIG. 4. The center line of the first space 17 and the second spaced 18 thereunder is shown by dash-and-dot line in FIG. 4, and a plurality of arrows extending from the center line designate direction and strength of the magnetic field on the center line. The length of the arrows represents the strength of the magnetic field and direction of the arrows represents the direction of the field. As clearly seen from the FIG. 4, the first space 17 has the magnetic field in the first direction from the right to the left, and the second space 18 has the magnetic field in the second direction being the reverse of the first direction.

Since the first permanent magnet 11 and the second permanent magnet 12 have opposite polarity and are arranged in the vertical direction and are adjacent to each other and also the third permanent magnet 13 and the fourth permanent magnet 14 have opposite polarity and are arranged in the vertical direction and are adjacent to each other, the magnetic field, i.e. the distirbution of the magnetic lines of force in the first space 17 and the second space 18 are determined by interaction of the four permanent magnets 11-14.

As a result, the strength of the magnetic field at the boundary $P_0$ between the first space 17 and the second space 18 becomes substantially zero on account of cancellation due to the action of the two upper permanent magnets 11,13 and the action of the two lower permanent magnets 12,14. The strength of the magnetic field at the region near the boundary $P_0$ gradually increases in approximately linear relation. The strength of the magnetic field in the first space 17 and the second space 18 will now be described more detail. In the first space 17, the strength of the magnetic field in the first direction gradually increases from the boundary $P_0$ to position $P_1$ and then gradually decreases. In the second space 18, the strength of the magnetic field in the second direction gradually increases from the boundary $P_0$ to position $P_2$ and then gradually decreases. For this reason the distribution of the magnetic flux, i.e. the strength of the magnetic field as a whole becomes approximately S-shaped.

Figure 6:
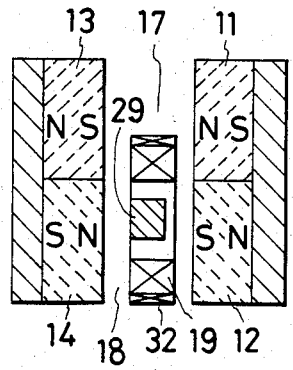
FIG. 6 is a sectional view illustrating the downward movement of the driving coil of the device in FIG. 1.

A driving coil is 19 wound in rectangular form as shown in FIGS. 1-3 and is arranged movably in the first space 17 and the second space 18, and comprises a first portion 19a located substantially within the first space 17 and a second portion 19b located substantially within the second space 18. When the driving coil 19 is supplied with d.c. current for depressing a pen from a drive circuit 20 as a part of means for supplying the driving current, current flows in the first portion 19a thereof in the arrow direction from the right to the left and at the second portion 19b in the arrow direction from the left to the right as shown in FIG. 1. Since the direction of the magnetic field acting on the first portion 19a is opposite to the direction of the magnetic field acting on the second portion 19b, both the first portion 19a and the second portion 19b are moved downwards. When the driving coil 19 is moved from the position shown in FIG. 5 to the position shown in FIG. 6, the strength of the magnetic field acting on the coil 19 varies depending on the positional variation of the coil 19. If the current in the coil 19 is held constant and a force is applied to the coil 19 which is moved downwards from the position of FIG. 5 to the position of FIG. 6. During movement of the coil 19 from position $P_1$ to position $P_2$ in FIG. 4 the strength of the magnetic field acting on the first portion 19a decreases and the strength of the magnetic field acting on the second portion 19b increases. Accordingly, variation of the force applied to the driving coil 19 is small.

A movable member 21 shown in FIGS. 1 and 2 is fixed to the driving coil 19 and provided with an arm 21a to support a pen 22 for recording in an X-Y plotter. In order to move the movable member 21 along the Y-axis, a slide bearing 23 is attached to the movable member 21 and a shaft or pin 24 extending in the vertical direction is engaged with the bearing 23. The right end of the movable member 21 is guided by a guide member 25 which permits linear movement in the vertical direction. The pin 24 and the guide member 25 are disposed on a stationary member 27. Reference numeral 26 designates a coil spring for resetting the movable member 21, and the coil spring is wound around the pin 24 and interposed between the movable member 21 and the stationary member 27. Reference numeral 28 designates a stopper attached to the guide member 25 for defining the upper limit of the movable member 21.

A Hall element 29 for position detecting is disposed at the center of the hollow portion 30 of the driving coil 19 and is fixed to the movable member 21 in a given relative position with respect to the coil 19. The Hall element 29 is moved in the first space 17 and the second space 18 through the magnetic shown in FIG. 4, and, as consequence, generates a voltage corresponding to the magnetic field. That is, the Hall element 29 generates an output voltage corresponding to the position of the coil 19 and the pen 22. Since the Hall element 29 is disposed at the center of the coil 19, it is moved in the region $P_1$–$P_2$ of FIG. 4 where strength of the magnetic field varies gradually in linear relation to its position an output generates voltage corresponding to the position with comparative accuracy. Therefore the current of the driving coil 19 can be controlled corresponding to the variation of position of the coil 19. Since the Hall element 29 is disposed at the hollow portion 30 of the driving coil 19, particular space for installing the position detecting means may be saved. As is clearly seen from FIGS. 1-3, a speed detecting coil 32 is wound outside the driving coil 19 in concentric relation. Therefore the speed detecting coil 32 is moved together with the driving coil 19 in the magnetic field of the first space 17 and the second space 18. As a result, a voltage corresponding to speed is obtained by the voltage detecting coil 32. That is, the speed of the pen 22 can be detected by the coil 32. In similar manner to the driving coil 19, the speed detecting coil 32 also comprises an upper portion 32a disposed substantially in the first space 17 and a lower portion 32b disposed substantially in the second space 18. During movement of the speed detecting coil 32 in the region from position $P_1$ to position $P_2$ in FIG. 4 if the strength of the magnetic field acting on the upper portion 32a decreases the field strength acting on the lower portion 32b increases. Accordingly, the induced voltage of the coil 32 as a whole does not vary significantly according to the positional variation of the coil 32, and an output voltage corresponding to the moving speed of the coil 32 is generated.

As clearly seen from FIG. 1, a means for supplying the driving coil 19 with controlled current is provided which comprises a driving circuit 20, a control circuit 33, a pen pressure setting voltage supply circuit 34, a current detecting resistor 35 and a current detecting circuit 36. Since the linear actuator according to this invention has the Hall element 39 for position detecting and the coil 32 for speed detecting, the current of the driving coil 19 can be controlled corresponding to speed and position of the pen 22. Accordingly, the time required to contact the pen 22 with the recording paper 37 can be reduced, and the contact pressure of the pen 22 against the recording paper 37 can be adjusted.

Figure 7:
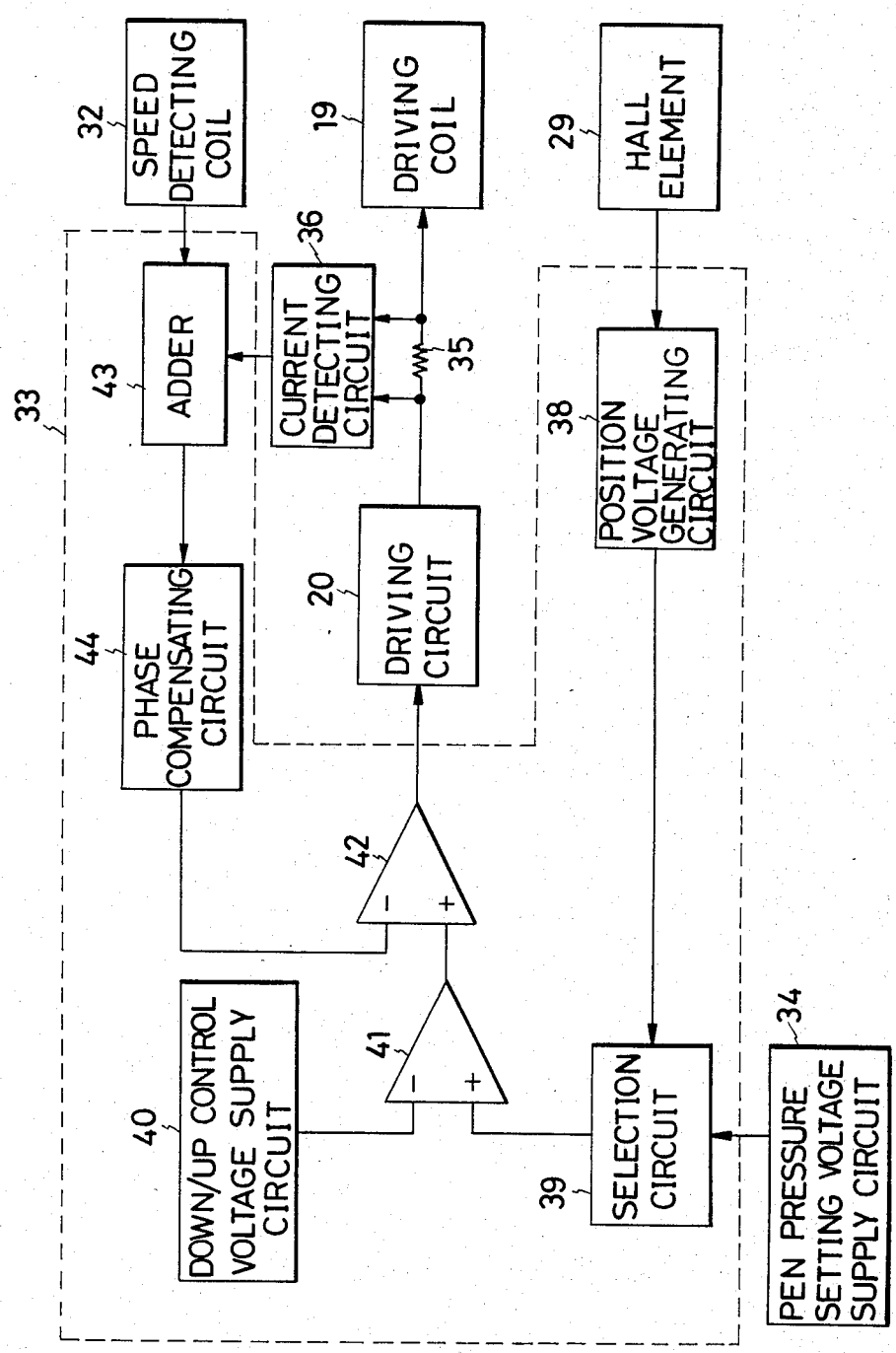
FIG. 7 is a block diagram illustrating the driving coil, the Hall element for position detecting, the speed detecting coil and the electric circuit connected thereto of the device in FIG. 1.

Referring to FIG. 7 illustrating the control circuit 33 of FIG. 1 in detail, a position voltage generating circuit 38 is connected to the Hall element 29 and generates a voltage corresponding to the position of the Hall element 29, i.e. the position of the pen 32. When the Hall element 29 is moved from the first space 17 to the second space 18, the direction of the output voltage is reversed. Therefore the position voltage generating circuit 38 includes a circuit for adding a bias voltage so as to generate the position voltage in one direction as shown by line $V_A$ in FIG. 8.

Figure 8:
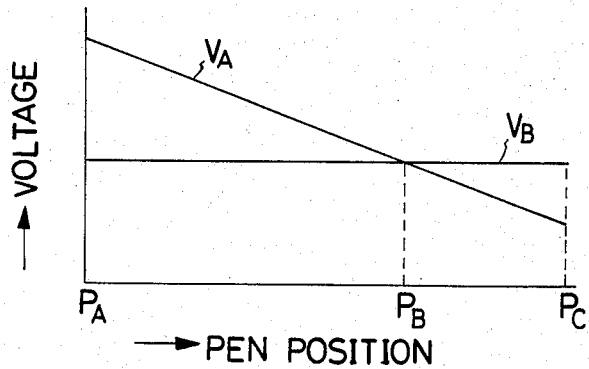
FIG. 8 is a diagram illustrating the relation of the position voltage and the pen pressure setting voltage with respect to the pen position in the circuit of FIG. 7.

The pen pressure setting voltage supply circuit 34 generates a voltage of a given level corresponding to a voltage required to contact the pen 22 with the recording paper 37 as shown in line $V_B$ of FIG. 8.

A selection circuit 39 selects either position voltage $V_A$ from the position voltage generating circuit 38 or pressure setting voltage $V_B$ from the pen pressure setting voltage supply circuit 34. In this embodiment, the position voltage $V_A$ decreases gradually from the upper limit position $P_A$ of the pen 22 to the contacting position $P_C$ of the pen 22 with the recording paper 37, and becomes less than the pen pressure setting voltage $V_B$ at position $P_B$. Then the selection circuit 39 selects the position voltage $V_A$ corresponding to the region between position $P_A$ and position $P_B$, and the pen pressure setting voltage $V_B$ corresponding to the region between position $P_B$ and $P_C$.

A down/up control voltage supply circuit 40 generates a down control voltage $V_L$ of a low level during the downward movement of the pen 22, and an up control voltage $V_H$ of high level during the upward movement of the pen 22.

A differential amplifier 41 performs substraction between the output voltage of the down/up control circuit 40 and the output voltage of the selection circuit 39.

A differential amplifier 42 receives the output of the previous differential amplifier 41 at one input terminal and a voltage at the other input terminal from a phone compensating circuit 44, and generates an output voltage based on the difference between the two input voltages. Since the driving circuit 20 is connected to the output of the differential amplifier 42, a current corresponding to the output voltage of the differential amplifier 42 is supplied to the driving coil 19.

A current detecting circuit 36 is provided for feedback control of the driving current which generates a voltage corresponding to the current flowing through the current detecting resistor 35. The voltage obtained from the current detecting circuit 36 is supplied through an adder 43 and the phase compensating circuit 44 to other input terminal of the differential amplifier 42. The adder 43 performs addition of the output voltage of the current detecting circuit 36 to the output voltage of the speed detecting coil 32. The phase compensating circuit 44 is a time-constant circuit or low-pass filter composed of a resistor and a capacitor, for example, and serves to delay phase at rising of the current detecting voltage and the speed detecting voltage.

If a down control voltage $V_L$ is generated by the down/up control voltage supply circuit 40 during the up state of the driving coil 19, the generated down control voltage $V_L$ is applied to the differential amplifier 41 and combined with the position voltage $V_A$ transmitted from the selection circuit 39, in this circumstance subtraction is performed between both input voltages of the differential amplifier 41. Since the down control voltage $V_L$ is set to zero volts in this embodiment, the position voltage $V_A$ is outputted from the differential amplifier 41 and entered to one input of the differential amplifier 42 of the next stage. In the beginning of down control, the pen 22 is at the upper limit position $P_A$ and the position voltage $V_A$ is comparatively high. Then both the speed voltage and the current detecting voltage are zero. As a result, the differential amplifier 42 generates high voltage and the driving coil 19 is supplied with comparatively large current. As the driving current increases, the current detecting voltage becomes high and also the speed voltage is generated from the speed detecting coil 32. Since the phase compensating circuit 44 is provided, the driving coil 19 is supplied with sufficient initial current. Therefore the pen 22 is rapidly moved downwards against the reset spring 26. For this reason, the response speed for moving the pen 22 downwards is very rapid. If the pen 22 is moved beyond the position $P_B$ shown in FIG. 8, the position voltage $V_A$ becomes lower than the pen pressure setting voltage $V_B$. Thereby the pen pressure setting voltage $V_B$ is outputted from the selection circuit 39 and entered in the differential amplifier 41. Since the pen pressure setting value $V_B$ is relatively low constant value, the driving coil 19 is supplied with relatively small current and impact of the pen 22 against the recording paper 37 can be reduced. For this reason, the soft landing of the pen 22 is possible.

When the pen 22 contacts with the recording paper 37, the speed voltage obtained from the speed detecting coil 32 becomes zero. Therefore constant current corresponding to the pen pressure setting voltage $V_B$ is supplied to the driving coil 19, and the constant contact pressure of the pen 22 is obtained.

When the pen 22 is moved upwards, the output of the down/up control voltage supply circuit 40 is changed from down control voltage $V_L$ to the up control voltage $V_H$. The up control voltage $V_H$ is set to a value greater than maximum value of the position voltage $V_A$. For this reason, the output of the differential amplifier 41 during the up control interrupts the driving current. If the current of the driving coil 19 is interrupted, the reset spring 26 acts to raise the driving coil 19 and the pen 22.

In order to adjust the contact pressure of the pen 22 with the recording paper 37, the value of voltage $V_B$ supplied from the pen pressure setting voltage supply circuit 34 may be varied.

Figure 9:
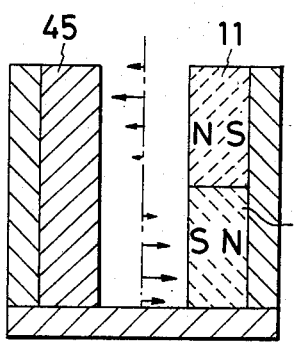
FIG. 9, FIG. 10 and FIG. 11 are sectional views illustrating a modification of the arrangement of the permanent magents.

The preferred embodiment disclosed herein is meant purely to illustrate or explain and not to impose limitation upon the invention, as a variety of modifications will readily occur to the specialists on the basis of this disclosure. The following is a brief list of such possible modifications:

1. As shown in FIG. 9, in place of the third and fourth permanent magnets 13,14 of FIG. 3, a yoke 45 may be opposed to the first and second permanent magnets 11,12.

Figure 10:
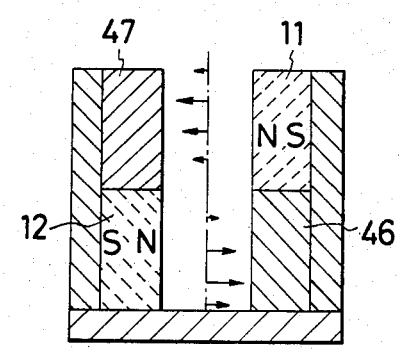

2. As shown in FIG. 10, yokes 46 and 47 may be arranged respectively in place of the second and third permanent magnets 12,13 of FIG. 3, and the second permanent magnet 12 may be opposed to the yoke 46.

Figure 11:
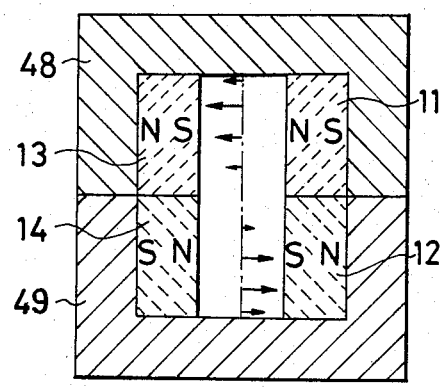

3. As shown in FIG. 11, a yoke 48 to connect the first permanent magnet 11 and the third permanent magnet 13 and a yoke 49 to connect the second permanent magnet 12 and the fourth permanent magnet 14 may be added.

Figure 12:
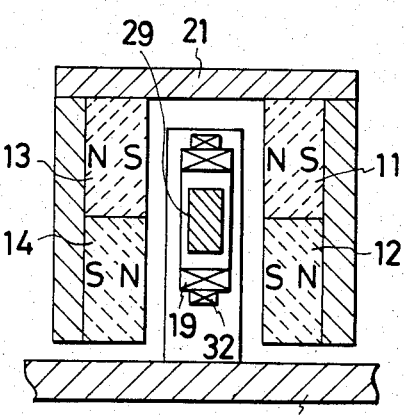
FIG. 12 is a sectional view of a linear actuator according to this invention in which the driving coil is stationary.

4. As shown in FIG. 12, the driving coil 19, the detecting coil 32 and the Hall element 29 may be fixed to the stationary member 27, and the permanent magnets 11,12,13,14 may be made movable and connected to the movable member 21. That is, objects of this invention can be attained by the relative movement between the driving coil 19 and the permanent magnets 11–14.

5. In order to move the pen 22 upwards, the driving coil 19 can be supplied with current in the reverse direction to that at the downward movement. In this constitution, the spring 26 may be omitted.

6. Magneto-electric converter such as magnetoresistance element may be used in place of the Hall element 29.

7. An adder may be used in place of the differential amplifier 41, and for example the down control voltage $V_L$ may be set to zero and the up control voltage $V_H$ be set to negative voltage. In place of the differential amplifier 41, a switch circuit may be used to control passing of the position voltage $V_A$ or the pen pressure setting voltage $V_B$ in response to the down/up control voltage.

What is claimed is:

1. A linear actuator comprising:
a first permanent magnet for creating a magnetic field in a first direction in a first space;
a second permanent magnet for creating another magnet field in a second direction, opposite to the first direction, in a second space contiguous to the first space, the relative positions of the first and second permanent magents being such that the strength of the magnetic fields created thereby is substantially zero at the boundary between the first and second spaces and changes approximately linearly at least in a region adjacent the boundary;
a driving coil having a first portion lying in the first space so as to be subjected to the action of the magnetic field due to the first permanent magnet, and a second portion lying in the second space so as to be subjected to the action of the magnetic field due to the second permanent magnet;
drive means for energizing the driving coil in order to create a linear relative motion between the first and second permanent magnets and the driving coil;
a magnetoelectric element disposed centrally within the driving coil and supported in a fixed relation thereto for generating an electric signal representative of the position of the driving coil relative to the first and second permanent magnets;
control means responsive to the output signal of the magnetoelectric element for controlling the drive means so as to cause the same to energize the driving coil in accordance with the position of the driving coil relative to the first and second permanent magnets; and
a member coupled to either of the first and second permanent magnets and the driving coil for linear motion therewith relative to the other.

2. The linear actuator of claim 1 wherein the magnetoelectric element is a Hall element.

3. The linear actuator of claim 1 further comprising a speed sensor for producing an electric signal representative of the speed of the linear relative motion between the first and second permanent magnets and the driving coil, the control means being responsive to both of the output signals of the magnetoelectric element and the speed sensor for controlling the drive means.

4. The linear actuator of claim 3 wherein the speed sensor is a coil arranged concentrically with the driving coil.

5. The linear actuator of claim 1 further comprising:
a third permanent magnet opposed to the first permanent magnet across the first space and coacting therewith to create the magnetic field in the first direction; and
a fourth permanent magnet opposed to the second permanent magnet across the second space and coacting therewith to create the magnetic field in the second direction.

6. The linear actuator of claim 1 further comprising a yoke opposed to the first and second permanent magnets across the first and second spaces.

7. A linear actuator for particular use in moving a marking instrument in a direction normal to a surface to be marked, comprising:
a first pair of permanent magnets opposed to each other across a first space and so magnetically oriented as to create in the first space a first magnetic field in a first direction;
a second pair of permanent magnets opposed to each other across a second space, contiguous to the first space, and so magnetically oriented as to create in the second space a second magnetic field in a second direction opposite to the first direction, the relative positions and magnetic orientations of the first and second pairs of permanent magnets being such that the total strength of the first and second magnetic fields is substantially zero at the boundary between the first and second spaces and varies linearly at least in a region adjacent to the boundary;

a driving coil having a first portion lying in the first space so as to be subjected to the action of the first magnetic field and a second portion lying in the second space so as to be subjected to the action of the second magnetic field;

a drive means for energizing the driving coil in order to cause a linear travel thereof relative to the first and second pairs of permanent magnets in a direction normal to the first and second directions;

a movable member coupled to the driving coil for joint linear travel therewith;

guide means for guiding the linear travel of the movable member with the driving coil;

a magnetoelectric element disposed centrally in a hollow of the driving coil and movable therewith relative to the first and second pairs of permanent magnets, the magnetoelectric element being effective to generate an electric signal representative of the position of the driving coil relative to the first and second pairs of permanent magnets; and control means responsive to the output signal of the magnetoelectric element for controlling the drive means so as to cause the same to energize the driving coil in accordance with the position of the driving coil relative to the first and second pairs of permanent magnets;

whereby, for example, the marking instrument on being carried by the movable member can be moved linearly in a direction normal to the surface.

8. The linear actuator of claim 7 further comprising a speed sensor for producing an electric signal representative of the speed of the linear travel of the driving coil relative to the first and second pairs of permanent magnets, the output signal of the speed sensor being also delivered to the control means to cause the same to control the drive means in accordance with the traveling speed of the drive coil.

9. The linear actuator of claim 7 further comprising resilient means for biasing the movable member in such a direction that, for example, the marking instrument carried by the movable member tends to move away from the surface to be marked, the drive means energizing the driving coil in such a direction as to cause the marking instrument to move toward the surface against the bias of the resilient means.

* * * * *

UNITED STATES PATENT AND TRADEMARK OFFICE
CERTIFICATE OF CORRECTION

PATENT NO. : 4,527,108
DATED : July 2, 1985
INVENTOR(S) : Toyoaki Enda

It is certified that error appears in the above-identified patent and that said Letters Patent are hereby corrected as shown below:

Column 4, line 64, after "position" insert --. The Hall element 29, therefore generates--;

Column 4, line 65, after "output", delete "generates".

Signed and Sealed this

Fifteenth Day of October 1985

[SEAL]

Attest:

DONALD J. QUIGG

Attesting Officer

Commissioner of Patents and
Trademarks—Designate